United States Patent [19]
Allen

[11] Patent Number: 6,050,018
[45] Date of Patent: Apr. 18, 2000

[54] SANDSHRIMP TAIL FISH LURE

[76] Inventor: David R. Allen, 2124 D Soroya Ct. SW., Olympia, Wash. 98502

[21] Appl. No.: 09/241,844

[22] Filed: Feb. 1, 1999

[51] Int. Cl.⁷ .................................................. A01K 85/00
[52] U.S. Cl. ............................ 43/4.5; 43/44.9; 43/43.15; 43/44.2
[58] Field of Search .................... 43/44.9, 44.91, 43/42, 43.15, 44.83, 42.53, 43.1, 42.49, 42.36, 44.2; D22/146

[56] References Cited

U.S. PATENT DOCUMENTS

| | | |
|---|---|---|
| 2,033,701 | 3/1936 | Gibbs . |
| 2,043,817 | 6/1936 | Stuck . |
| 2,584,231 | 2/1952 | Schmidt . |
| 2,634,540 | 4/1953 | Nelson . |
| 2,722,768 | 11/1955 | Fleetwood . |
| 2,787,858 | 4/1957 | Best . |
| 2,791,060 | 5/1957 | Kender . |
| 2,792,665 | 5/1957 | Brickler . |
| 2,881,549 | 4/1959 | Bryan . |
| 3,341,966 | 9/1967 | Pippen . |
| 3,392,476 | 7/1968 | Zielaskowski . |
| 3,760,526 | 9/1973 | Hicks . |
| 4,167,076 | 9/1979 | Weaver ...................................... 43/42.2 |
| 4,603,502 | 8/1986 | MacDonald . |
| 4,977,699 | 12/1990 | Mannix . |
| 5,142,811 | 9/1992 | Freeman .................................. 43/42.53 |
| 5,794,376 | 8/1998 | Frizzell .................................. 43/43.15 |

*Primary Examiner*—Jack W. Lavinder
*Attorney, Agent, or Firm*—Brian J. Coyne

[57] ABSTRACT

A rig for bait casting sandshrimp tails, and method for using the rig. A fish hook is attached to a forward end of fishing line leader. The forward end of a longitudinally elongated bait threader is attached to a rear end of the leader. A buoyant, bowling-pin-shaped, bobber is slidably mounted on the leader between the hook and threader. The rear end of the threader is pointed. In use, the pointed end of the threader is inserted longitudinally through a sandshrimp tail. The tail is moved forward over and past the threader, thence forward along the leader and onto the bobber so as to substantially enclose and surround the bobber. The rear end of the threader is then attached to a double swivel that is coupled to a weight and a fishing line.

3 Claims, 4 Drawing Sheets

SANDSHRIMP TAIL FISH LURE

CROSS REFERENCE TO RELATED APPLICATIONS

Not applicable.

STATEMENT REGARDING FEDERALLY APPROVED RESEARCH OR DEVELOPMENT

Not applicable.

BACKGROUND OF THE INVENTION

1. Field of the Invention

This invention relates generally to fish baiting devices and methods, and particularly to fishing rigs and methods for bait casting sandshrimp tails.

2. Background Art

In certain kinds of fishing, such as fishing for steelhead, salmon, trout, etc., the bait of choice is the tail of a sandshrimp. Prior to my invention, a sandshrimp tail was placed directly on a fish hook. But, as sandshrimp tails are quite fragile, this meant that frequent replacement of bait was required. My invention solves this problem by providing a baitcasting rig that includes a buoyant, streamlined, bobber connected by leader to a bait threader, and a method for mounting a sandshrimp tail on the bobber by drawing the tail over the threader and leader and onto the bobber so that the tail substantially surrounds the bobber. Due to the buoyancy of the bobber, my invention also effectively floats the bait off the bottom of the water being fished.

Mannix, U.S. Pat. No. 4,977,699, disclosed an open eye awl, and a method for creating a longitudinal channel through bait through which to draw leader and the shank of a fish hook. Although this method avoided damaging the bait with the barbed point of a hook, it left the bait strung on leader, which provided inadequate support for bait as fragile as a sandshrimp tail; moreover it provided no flotation for the bait.

Schmidt, U.S. Pat. No. 2,584,231, disclosed a skewer having a shank, a handle attached to one end of the shank, and a skewer hook formed at an opposite end of the shank. A bailing sleeve, slidable along the skewer shank, was provided for pushing bait mounted on the skewer along line attached to the skewer hook and onto a hook attached to the line. Hicks, U.S. Pat. No. 3,760,526, disclosed a holder for live shrimp or similar fish bait having a flexible shell defining a cavity sized and shaped to receive the forward end of the shrimp, with the tail of the shrimp exposed and free to make swimming movements. The devices disclosed by Schmidt and by Hicks, however, were both unsatisfactory to preserve the integrity of bait as fragile as a sandshrimp tail.

SUMMARY OF THE INVENTION

There remains, therefore, a need for a device and method for baitcasting sandshrimp tail lures. Accordingly, the present invention provides a bobber for bait casting a sandshrimp tail. The bobber is comprised of a solid, buoyant substance, such as Polystyrene® or Polyurethane®. The bobber is longitudinally elongated in the form of a bowling pin, having a relatively narrow forward end and a relatively wide rear end. A longitudinal bore extends through the bobber so that the bobber can be strung on a leader. The size of the bobber is suitable for insertion into the interior of a sandshrimp tail so that the tail can substantially surround the bobber. Optionally, the bobber may contain coloring to mimic the appearance of the interior of a sandshrimp tail.

The invention further provides a fishing rig for bait casting a sandshrimp tail, and a method for using the rig. The rig includes a longitudinally elongated bait threader having a pointed rear end, and buoyant, bowling-pin-shaped bobber. Fish line leader is drawn through the bore of the bobber and a forward end of the leader is attached to a fish hook. A rear end of the leader is attached to a forward end of an elongated bait threader. A free, rear end of the bait threader is used to skewer a sandshrimp tail. The tail is then drawn forward over the bait threader, along the leader, and up onto the bobber so that the tail substantially surrounds the bobber. A forward end of a double swivel is attached to the rear end of the threader, a weight or sinker is attached to a rear end of the swivel, and a fish line is also attached to the rear end of the swivel.

DETAILED DESCRIPTION OF THE PREFERRED EMBODIMENT

Figure 1:
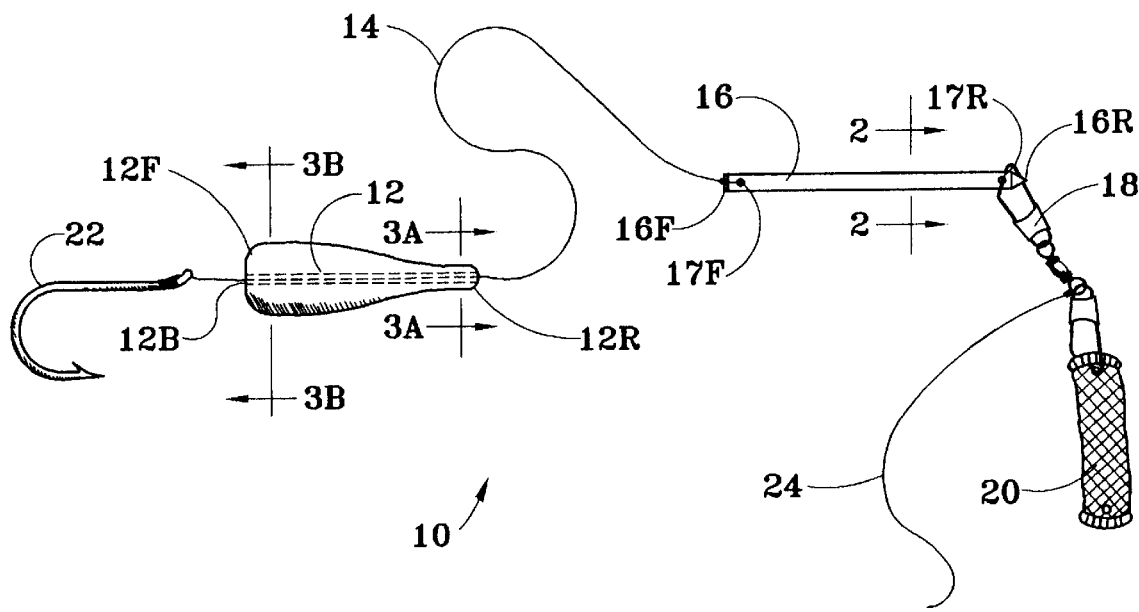
FIG. 1 is a top plan view of my sandshrimp bait casting rig, shown attached to a fishing line.
Figure 2:
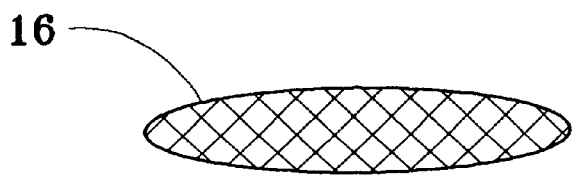
FIG. 2 is an enlarged, cross sectional view of the threader thereof taken along line 2—2 of FIG. 1.

Referring to FIG. 1, a shrimp tail bait casting rig, denoted generally by the numeral 10, is shown. The rig 10 includes a longitudinally elongated bait threader 16 having a blunt forward end 16F and a pointed rear end 16R. The threader 16 preferably has an oval lateral cross-section, as shown in FIG. 2, and has forward and rear apertures 17F, 17R near the forward end 16F and the rear end 16R, respectively. The rig 10 further includes a length of fishing line leader 14. A fish hook 22 is attached to a forward end of the leader 14; the rear end of the leader 14 is tied to the forward end 16F of the threader 16 at aperture 17F. The rig 10 further includes a double swivel 18, having a forward end reversibly attachable to the rear end 16R of the leader 16 at the aperture 17R adjacent thereto, and having a rear end reversibly attachable to a weight or sinker 20 and a fishing line 24.

Figure 3A:
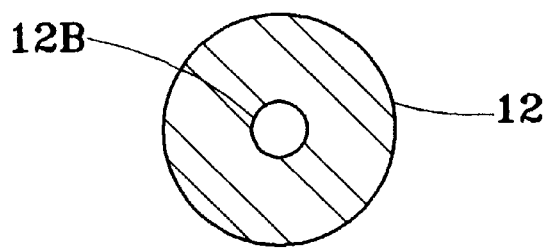
FIG. 3A is an enlarged, cross sectional view of the relatively narrow, forward portion of the bobber thereof taken along line 3A—3A of FIG. 1.
Figure 3B:
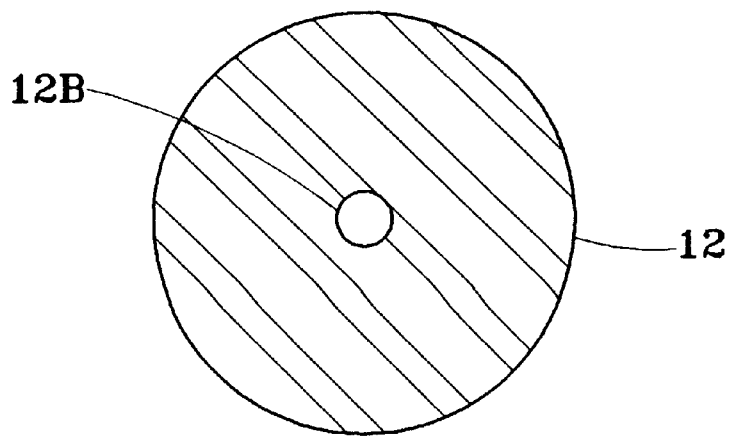
FIG. 3B is an enlarged, cross sectional view of the relatively wide, rear portion of the bobber thereof taken along line 3B—3B of FIG. 1.

A longitudinally elongated, buoyant bobber 12 is slidably mounted on the leader 14 between the fish hook 22 and the threader 16. The bobber 12 is shaped like a miniature bowling pin, having a relatively narrow rear end 12R and a relatively wide forward end 12F, and everywhere has a circular, lateral cross section, as may be seen in FIGS. 3A, 3B. The bobber has a longitudinal, axial bore 12B through which the leader 14 has been drawn, with diameter about $\frac{1}{32}$ inch diameter. The bobber 12 is of a size suitable for insertion into the interior of a sandshrimp tail, with length typically 1¼ inch, and maximum exterior diameter ⅜ inch, more or less. The bobber may be colored (pink, for example)

to mimic the interior appearance of a sandshrimp tail. The bobber may be made of any rigid, water impervious material that is buoyant in water, but Polystyrene® is preferred.

Figure 4:
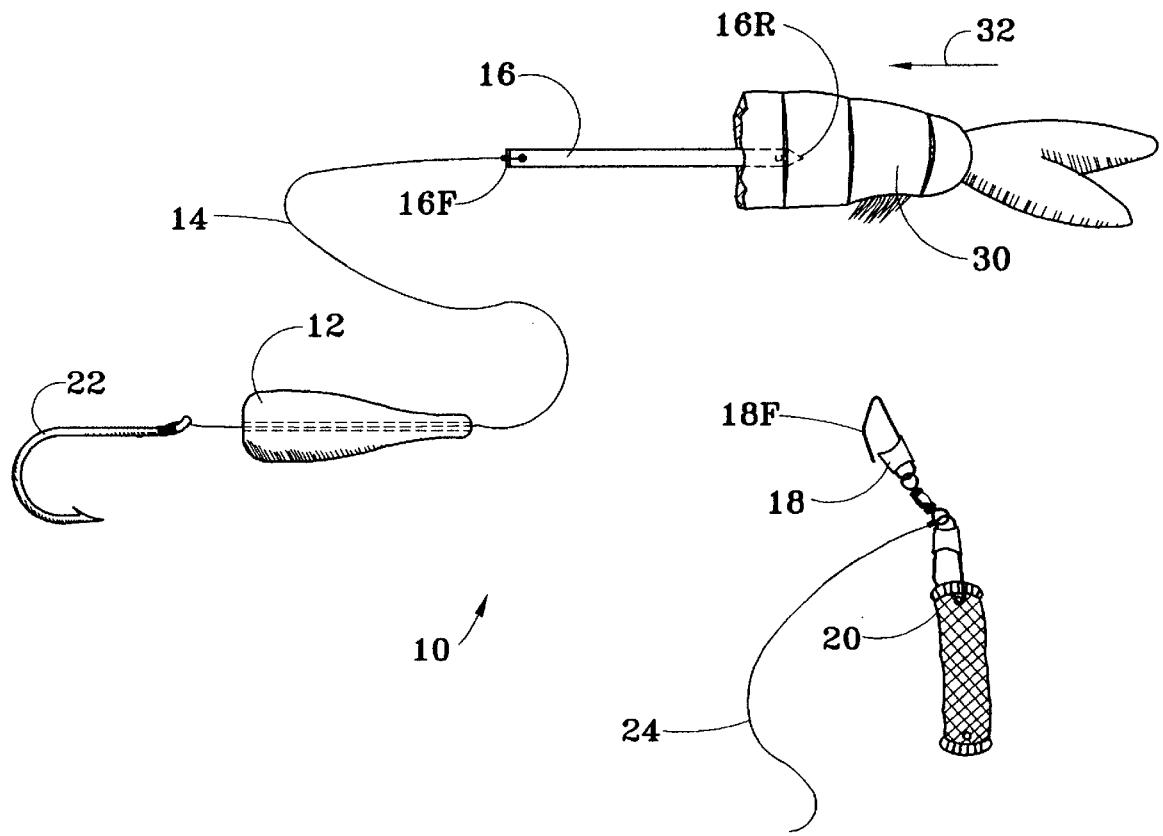
FIG. 4 shows the threader of my sandshrimp tail bait casting rig disconnected from the swivel thereof, and a sandshrimp partially skewered by the pointed end of the threader and being pushed forward onto the threader.
Figure 5:
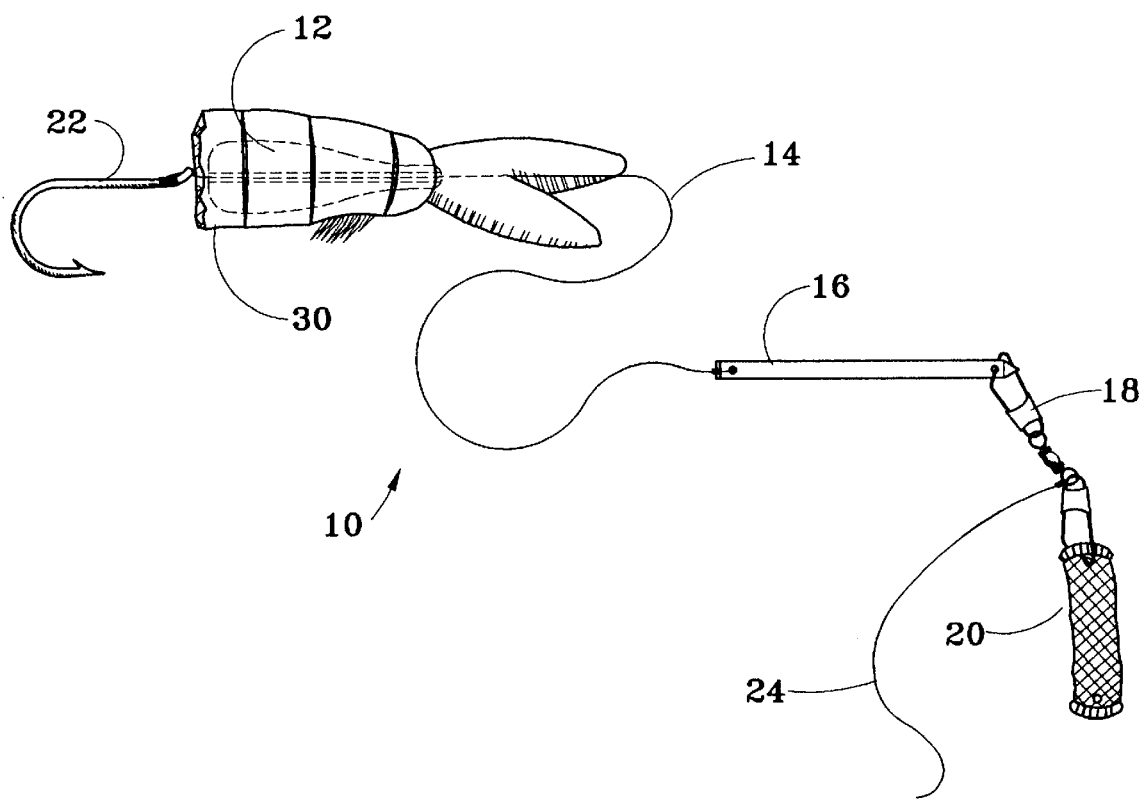
FIG. 5 shows my rig ready for bait casting, with a sandshrimp tail mounted on the bobber and substantially surrounding the same, and the threader reattached to the swivel.

Referring now to FIGS. 4 and 5, my method of mounting a sandshrimp tail on the bobber is shown. After disconnecting the pointed, rear end 16R of the threader 16 from the swivel 18, said end 16R is inserted into a forward end potion of a sandshrimp tail 30. The sandshrimp tail 30 is then pushed forward, as denoted by the arrow 32, completely past the threader 16, thence forward along the leader 14 and onto the end bobber, so that the shrimp tail 30 substantially encloses and covers the bobber 12, as may be seen in FIG. 5. The forward portion 18F of the swivel 18 is then reconnected to the rear end 16R of the threader 16, and the rig 10 is ready for bait casting.

It will be appreciated that various modifications can be made to the exact form of the present invention without departing from the scope thereof. It is accordingly intended that the disclosure be taken as illustrative only and not limiting in scope, and that the scope of the invention be defined by the following claims.

I claim:

1. A fishing rig for bait casting a sandshrimp tail, comprising:

(a) a longitudinally-elongated, bait threader having a first, forward end, and a second, rear end;

(b) a longitudinally elongated, bowling-pin-shaped, buoyant bobber having a longitudinal bore therethrough, said bobber having a relatively wide, forward end, and an opposite, relatively narrow, rear end, and being of suitable size for slidably mounting thereupon the tail of a sandshrimp;

(c) a leader inserted through the bore of the bobber and having a forward end and an opposite, rear end, said rear end being attached to the first end of the threader;

(d) a double-swivel attached to said rear end of the threader;

(e) a fish hook attached to the front end of the leader; and (f) a fishing line weight attached to the double-swivel.

2. The fishing rig of claim 1, wherein the bobber is colored in a manner to mimic the interior color of a sandshrimp tail.

3. A method of preparing a sandshrimp tail for bait casting, comprising the steps of:

(a) drawing a leader through a bowling pin-shaped, buoyant bobber, said bobber having a relatively narrow, front end and a relatively wide rear end;

(b) attaching a fishing hook to a first end of said leader;

(c) attaching a first end of a longitudinally elongated threader to a second, opposite end of the leader;

(d) inserting the rear end of the bobber into the sandshrimp tail and drawing the tail completely over the threader, thence forward along the leader and onto the bobber so that the tail substantially surrounds the bobber;

(e) attaching a first end of a double swivel to a second, opposite end of the threader;

(f) attaching a fishing weight to a second, opposite end of the swivel; and (g) attaching a fishing line to the swivel.

* * * * *